CHARLES W. PEELER and NORMAN C. JOHNSON.
IMPROVEMENT IN THE MANUFACTURE OF SEAMLESS SHOES.
No. 117811. Patented Aug. 8 1871.
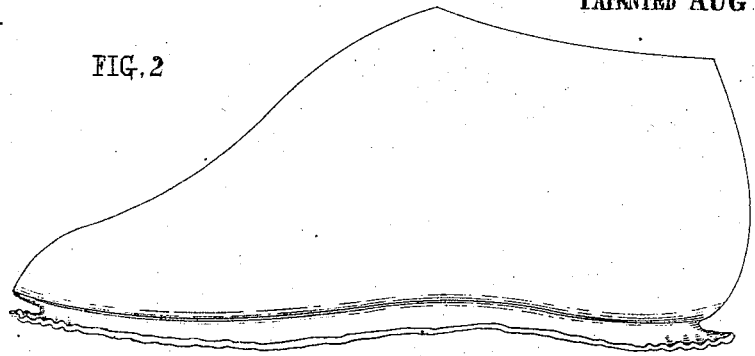
FIG. 2
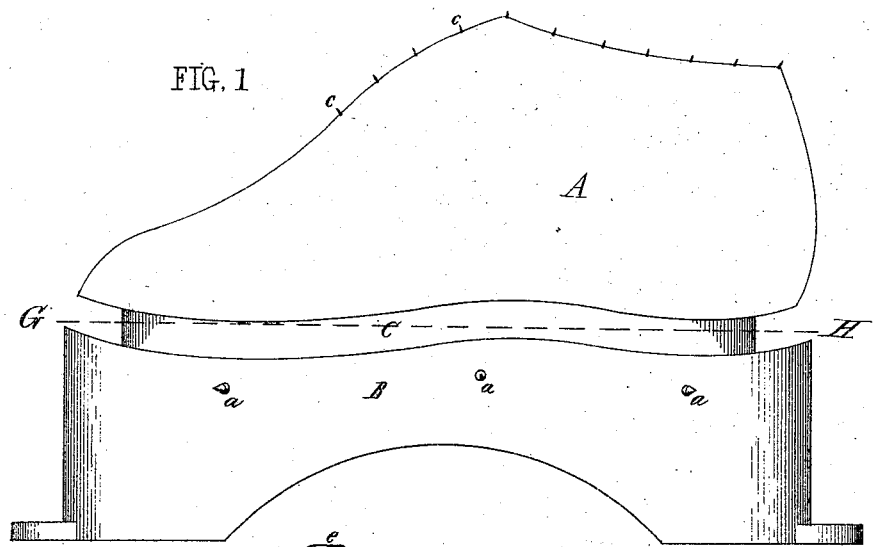
FIG. 1
FIG. 4
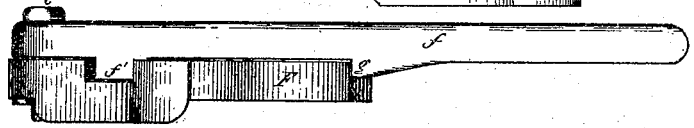
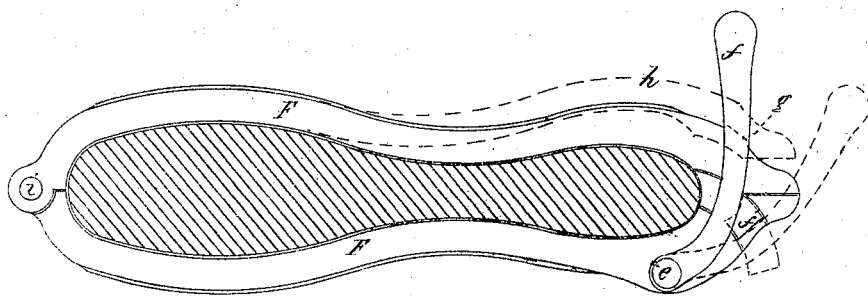
FIG. 3
Witnesses,
Clarence Buckland.
Samuel E. Howard.
Charles W. Peeler, Inventor.
Norman C. Johnson.
By J. A. Curtis, their atty.

UNITED STATES PATENT OFFICE.

CHARLES W. PEELER, OF CHICAGO, ILLINOIS, AND NORMAN C. JOHNSON, OF SPRINGFIELD, MASSACHUSETTS.

IMPROVEMENT IN MANUFACTURE OF SEAMLESS SHOES.

Specification forming part of Letters Patent No. 117,811, dated August 8, 1871.

*To all whom it may concern:*

Be it known that we, CHARLES W. PEELER, of Chicago, in the county of Cook and State of Illinois, and NORMAN C. JOHNSON, of Springfield, in the county of Hampden and State of Massachusetts, have invented a new and useful Improvement in the Manufacture of Seamless Shoes; and we do hereby declare that the following is a full, clear, and exact description thereof, reference being had to the accompanying drawing making a part of this specification and to the letters of reference marked thereon, in which—

Figure 1 represents a mold with its fastenings and heating-chamber upon which to form a seamless shoe-upper. Fig. 2 shows the seamless shoe-upper as it comes from the mold or form. Fig. 3 is a longitudinal horizontal section of the mold through line G H, showing the clamps; and Fig. 4 is an end view of the clamps.

Our invention relates to the process of manufacturing seamless uppers for shoes, slippers, overshoes, &c., from a woven or textile fabric, by stretching the cloth, which has been previously sized, upon a heated form or mold, and confining it in the position into which it has been so stretched until it has become properly set, so that it will retain its form and shape after it is taken from the form.

That others skilled in the art may be able to make and use our invention, we will proceed to describe the same.

In the drawing, A represents a last or form, which is mounted upon a block, B, both of which may be cast in one piece. The block B is made hollow, in which to apply and confine the heat in heating the form A, which is made solid in order that it may retain the heat longer. A channel, C, extends all around the lower edge of the mold, between the mold and the block B, and the pins $a$ are placed in the block below the said channel; and pins $c$ are set in the top of the mold, if desirable, although it is not necessary to the successful operation of the device in forming the uppers that the pins $c$ should be used. If the mold is to be used without the pins $c$ the cloth is left whole, and of a sufficient size to be placed upon the top of the last, and its edges drawn down and attached to the pins $a$, the cloth being thus stretched tightly over the last or form A. The clamps consist of the pieces F, which are of a sufficient size and form to fit somewhat loosely the channel C, and are hinged together at $i$. At the other end a handle, $f$, is pivoted at $e$, said handle having a piece, $f'$, upon the lower side, which moves out and in as the handle is moved, the inner end of the piece $f'$ being nearly flush with the inner side of the clamps F when they are shut together and the handle moved in. Another projection, $g$, is made upon the lower side of the handle, nearer the end, which impinges against the outer edge of one of the pieces F as the handle is moved in when the clamps are together, said projection serving to secure the clamps together when they are closed.

The operation of the device is as follows: The cloth, which may be of any texture desirable, (a common woolen fabric being preferable, as it is less inclined to absorb moisture than many other kinds,) being properly sized, is placed upon the top of the mold A, and the lower edges drawn down tightly and secured upon the pins $a$. The clamps F are then opened and placed around the cloth so stretched at the channel C, and the clamps are then brought together firmly, the handle $f$ pushed in, thus forcing the cloth into the channel all around. This operation stretches the cloth very tightly upon the form A, as it confines the cloth at its lower edge within the channel, and keeps the cloth firmly secured in that position until it is set. To accomplish this setting of the cloth, however, the form is heated to a sufficient degree by introducing a flame, either from a gas-jet or other convenient device, underneath the form and within the hollow base B. If the cloth stretched upon the heated form be left for a few minutes the cloth will become set and will retain its form into which it has thus been molded. In binding the opening of the upper it could be better done, perhaps, before the form was given to it; and, in that case, the form of the cloth for the upper could be cut out approximately, and the hole cut in the middle for the opening, and the edge of the opening have the binding sewed thereto upon a sewing-machine. The edge of the opening would then be secured to the pins $c$ at the top of the form, and the cloth stretched over the form as before, with the lower edge secured to the lower pins $a$. The cloth, before being stretched upon the form, should have a solution of sizing, of a proper consistency, applied thereto, and should be a little damp, as it will then assume and retain the form more readily and perfectly.

We are aware that seamless articles of wearing apparel have heretofore been made, such as coats, hats, shoes, &c.; but these have been made by a process of felting or whipping, which we do not claim as a part of our invention, the process hereinbefore described relating entirely to the manufacture of seamless shoes and similar articles by confining a woven or textile fabric upon a heated form entirely unaccompanied by any process of whipping or felting whatever. By this process the uppers of shoes and similar articles may be manufactured and sold in market in quantities by parties not familiar with the ordinary process of shoe manufacture, and the bottoms may be attached by other parties who are familiar with such processes.

Having thus described our invention, what we claim as new, and desire to secure by Letters Patent, is—

1. The former or mold A, having the groove or channel C therein, in combination with the clamps F hinged at $i$, and secured together in said groove by the lever $f$, substantially as and for the purpose described.

2. As a new article of manufacture, a seamless shoe-upper made from a woven or textile fabric, substantially in the manner and by the process herein described.

CHARLES W. PEELER.
NORMAN C. JOHNSON.

Witnesses:
M. J. DUNNE,
A. E. GUILD, Jr.